United States Patent
Song et al.

(10) Patent No.: US 11,851,589 B2
(45) Date of Patent: Dec. 26, 2023

(54) ADHESIVE COMPOSITION FOR FOLDABLE DISPLAY, ADHESIVE FILM USING SAME, AND FOLDABLE DISPLAY COMPRISING

(71) Applicant: LG CHEM, LTD., Seoul (KR)

(72) Inventors: Hee Song, Daejeon (KR); Hyon Gyu Park, Daejeon (KR); Byungsu Park, Daejeon (KR); Hyun Cheol Kim, Daejeon (KR); Hui Je Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 238 days.

(21) Appl. No.: 16/766,359

(22) PCT Filed: Feb. 1, 2019

(86) PCT No.: PCT/KR2019/001433
§ 371 (c)(1),
(2) Date: May 22, 2020

(87) PCT Pub. No.: WO2019/151822
PCT Pub. Date: Aug. 8, 2019

(65) Prior Publication Data
US 2020/0377768 A1    Dec. 3, 2020

(30) Foreign Application Priority Data

Feb. 2, 2018 (KR) .................. 10-2018-0013378

(51) Int. Cl.
| | |
|---|---|
| *C09J 133/08* | (2006.01) |
| *C09J 11/04* | (2006.01) |
| *C09J 11/06* | (2006.01) |

(52) U.S. Cl.
CPC ............. *C09J 133/08* (2013.01); *C09J 11/04* (2013.01); *C09J 11/06* (2013.01)

(58) Field of Classification Search
CPC . C09J 133/08; C09J 11/04; C09J 11/06; C09J 133/064; C09J 201/00;
(Continued)

(56) References Cited

U.S. PATENT DOCUMENTS

| | | |
|---|---|---|
| 2005/0197450 A1 | 9/2005 | Amano et al. |
| 2005/0244633 A1 | 11/2005 | Kobayashi et al. |

(Continued)

FOREIGN PATENT DOCUMENTS

| | | |
|---|---|---|
| JP | H08-155040 A | 6/1996 |
| JP | 2005-290357 A | 10/2005 |

(Continued)

OTHER PUBLICATIONS

JP 2011-017029 A, machine translation, EPO espacenet. (Year: 2011).*

(Continued)

*Primary Examiner* — Frances Tischler
(74) *Attorney, Agent, or Firm* — ROTHWELL, FIGG, ERNST & MANBECK, P.C.

(57) ABSTRACT

The present application provides an adhesive composition for a foldable display including a thermocurable resin; an ionic salt; and a crosslinking agent, wherein the adhesive composition for a foldable display has storage modulus of $10^4$ Pa to $10^6$ Pa at −30° C. and 60° C. after curing, an adhesive film using the same, and a foldable display including the same.

14 Claims, 2 Drawing Sheets

(58) Field of Classification Search
CPC ............ C09J 2203/318; C09J 2301/408; C09J 2433/00; C09J 7/30; C08K 5/095; C08K 5/19
USPC ........................................................ 524/168
See application file for complete search history.

(56) References Cited

U.S. PATENT DOCUMENTS

| | | |
|---|---|---|
| 2010/0252185 A1 | 10/2010 | Kiuchi et al. |
| 2011/0033720 A1 | 2/2011 | Fujita et al. |
| 2012/0321819 A1 | 12/2012 | Kim et al. |
| 2015/0205025 A1 | 7/2015 | Park et al. |
| 2019/0292414 A1 | 9/2019 | Higashi et al. |

FOREIGN PATENT DOCUMENTS

| | | | |
|---|---|---|---|
| JP | 2005306937 A | * | 11/2005 |
| JP | 2011017029 A | * | 1/2011 |
| JP | 2016-164214 A | | 9/2016 |
| KR | 2006-0047584 A | | 5/2006 |
| KR | 2010-0058429 A | | 6/2010 |
| KR | 2011-0002857 A | | 1/2011 |
| KR | 2011-0098691 A | | 9/2011 |
| KR | 2012-0044315 A | | 5/2012 |
| KR | 2013-0022396 A | | 3/2013 |
| KR | 10-2017-0061007 A | | 6/2017 |
| KR | 2017-0062374 A | | 6/2017 |
| KR | 2017-0070753 A | | 6/2017 |
| KR | 2017-0097850 A | | 8/2017 |
| TW | 201043471 A | | 12/2010 |
| WO | 2018-012161 A1 | | 1/2018 |

OTHER PUBLICATIONS

KR 10-2017-0062374 A, machine translation, EPO espacenet. (Year: 2017).*

JP 2005306937 A, machine translation, EPO espacenet. (Year: 2005).*

Kr 2017-0097850A, machine translation, EPO espacenet. (Year: 2017).*

Search Report and Written Opinion issued for corresponding International Patent Application No. PCT/KR2019/001433 dated May 13, 2019, 9 pages.

* cited by examiner

【FIG. 1】

| 107 |
|---|
| 106 |
| 105 |
| 104 |
| 103 |
| 102 |
| 101 |

【FIG. 2】

| 204 |
|---|
| 205 |
| 203 |
| 205 |
| 202 |
| 205 |
| 201 |

[FIG. 3]
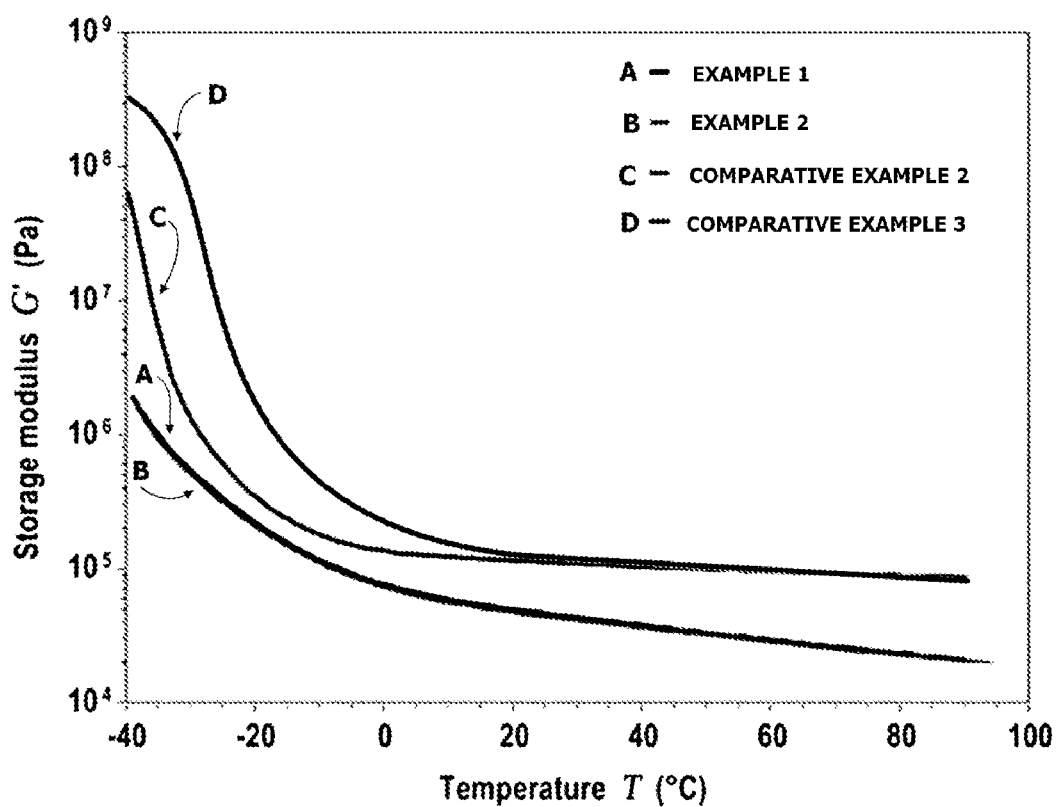

ADHESIVE COMPOSITION FOR FOLDABLE DISPLAY, ADHESIVE FILM USING SAME, AND FOLDABLE DISPLAY COMPRISING

This application is a 35 U.S.C. 371 National Phase Entry Application from PCT/KR2019/001433 filed on Feb. 1, 2019, designating the United States and which claims priority to and the benefits of Korean Patent Application No. 10-2018-0013378, filed with the Korean Intellectual Property Office on Feb. 2, 2018, the entire contents of which are incorporated herein by reference.

TECHNICAL FIELD

The present application relates to an adhesive composition for a foldable display, an adhesive film using the same, and a foldable display including the same.

BACKGROUND OF THE INVENTION

With recent development of display-relating technologies, display devices transformable at the stage of use such as folding, rolling to a roll shape or stretching like a rubber band have been researched and developed. These displays may be transformed into various shapes, and therefore, may satisfy demands for both a larger display at the stage of use and a smaller display for portability.

A transformable display device may be transformed into various shapes in response to user demands or in accordance with needs of the situation in which the display device is used as well as transformed into shapes set in advance. Accordingly, the transformed shape of the display needs to be recognized, and the display device needs to be controlled in response to the recognized shape.

Meanwhile, a transformable display device has a problem in that each constitution of the display device may be damaged by transformation, and therefore, each constitution of such a display device needs to satisfy folding reliability and stability.

BRIEF DESCRIPTION OF THE INVENTION

The present application provides an adhesive composition for a foldable display, an adhesive film using the same, and a foldable display including the same.

One embodiment of the present disclosure provides an adhesive composition for a foldable display including a thermocurable resin; an ionic salt; and a crosslinking agent, wherein the adhesive composition for a foldable display has storage modulus of $10^4$ Pa to $10^6$ Pa at $-30°$ C. and $60°$ C. after curing.

Another embodiment of the present application provides an adhesive film including a cured material of the adhesive composition for a foldable display described above.

Still another embodiment of the present application provides a foldable display including the adhesive film described above.

Advantageous Effects

An adhesive composition for a display according to one embodiment of the present application increases a dielectric constant by adding an ionic salt and thereby increasing ion conduction of the adhesive composition. Particularly, when the ionic salt is favorably ion-dissociated in the adhesive composition, ion conduction increases, and a relative dielectric constant is enhanced.

By adding an ionic salt to a storage modulus-decreased adhesive in order to obtain folding properties without damaging a display as an adhesive for a foldable display, an adhesive composition having an increased dielectric constant by increasing internal ion conduction is provided.

The present disclosure increases a dielectric constant while maintaining adhering properties and folding properties that existing foldable adhesives have, and enables high resolution and fast responsive touch in an on-cell type touch (TOE). In addition, as types of the ionic salt of the present disclosure, metal salts and organic salts can all be used, and salts that are favorably ion-dissociated inside the adhesive and thereby have more favorable ion conduction enhance a relative dielectric constant.

BRIEF DESCRIPTION OF DRAWINGS

FIG. 1 is a mimetic diagram of a specimen having a 2-set_stack up structure of a static folding test according to one embodiment of the present specification.

FIG. 2 is a mimetic diagram of a foldable display using an adhesive of the present specification.

FIG. 3 is a graph measuring temperature-modulus of Examples 1 and 2 and Comparative Examples 2 and 3 according to one embodiment of the present specification.

REFERENCE NUMERAL

101: Touch Panel or Display Panel
102, 104: Adhesive Layer (PSA: Pressure-sensitive adhesive)
103: Polarizing Film (POL)
105, 107: Hard Coating Layer (HC)
106: Polyimide Layer (PI)
201: Substrate
202: Touch panel or Display panel
203: Polarizing Film
204: Cover Window
205: Adhesive (PSA)

DETAILED DESCRIPTION OF THE INVENTION

Hereinafter, the present specification will be described in more detail.

Embodiments of the present disclosure will be described in detail with reference to accompanying drawings so that those skilled in the art may readily implement the present disclosure. However, the present disclosure may be embodied in various different forms, and is not limited the embodiments described herein.

In the present specification, a description of a certain part "including" certain constituents means capable of further including other constituents, and does not exclude other constituents unless particularly stated on the contrary.

In one embodiment of the present specification, the thermocurable resin includes a unit derived from a compound including an acrylate group.

In one embodiment of the present specification, the thermocurable resin is a (meth)acryl-based resin, and specifically, may include a unit derived from ethylhexyl (meth)acrylate, butyl (meth) acrylate, isobornyl (meth) acrylate, phenoxyethyl (meth)acrylate or 2-hydroxyethyl (meth)acrylate.

In one embodiment of the present specification, the compound including an acrylate group is ethylhexyl acrylate or acrylic acid.

In one embodiment of the present specification, the thermocurable resin includes a unit derived from ethylhexyl acrylate or acrylic acid.

In one embodiment of the present specification, the thermocurable resin includes a unit derived from ethylhexyl acrylate and acrylic acid.

In one embodiment of the present specification, the unit derived from ethylhexyl acrylate is included in 97 parts by weight to 99 parts by weight; and the unit derived from acrylic acid is included in 1 parts by weight to 3 parts by weight, with respect to 100 parts by weight of the thermocurable resin.

In one embodiment of the present specification, the unit derived from ethylhexyl acrylate is included in 98 parts by weight and the unit derived from acrylic acid is included in 2 parts by weight, with respect to 100 parts by weight of the thermocurable resin. When using the resin satisfying the above-mentioned content, a storage modulus value of the present disclosure may be satisfied.

In one embodiment of the present disclosure, the crosslinking agent is an epoxy-based crosslinking agent or an isocyanate-based crosslinking agent.

Examples of the epoxy-based crosslinking agent may include ethylene glycol diglycidyl ether, triglycidyl ether, trimethylolpropane triglycidyl ether, N,N,N',N'-tetraglycidyl-1,3-xylenediamine, glycerin diglycidyl ether or the like Examples of the isocyanate-based crosslinking agent may include an aromatic polyisocyanate such as 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, 2,4,6-triisocyanate toluene, 1,3,5-triisocyanate benzene, dianisidine diisocyanate, 4,4'-diphenyl ether diisocyanate, 4,4',4"-triphenylmethane triisocyanate, ω,ω-isocyanate-1,3-dimethylbenzene, ω,ω'-diisocyanate-1,4-dimethylbenzene, ω,ω'-diisocyanate-1,4-diethylbenzene, 1,4-tetramethylxylylene diisocyanate, 1,3-tetramethylxylene diisocyanate or xylylene diisocyanate; an aliphatic polyisocyanate such as trimethylene diisocyanate, tetramethylene diisocyanate, hexamethylene diisocyanate, pentamethylene diisocyanate 1,2-propylene diisocyanate, 2,3-butylene diisocyanate, 1,3-butalene diisocyanate, dodecamethylene diisocyanate or 2,4,4-trimethylhexamethylene diisocyanate; an alicyclic polyisocyanate such as 3-isocyanate methyl-3,5,5-trimethylcyclohexyl isocyanate, 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis(cyclohexyl isocyanate) or 1,4-bis(isocyanatemethyl)cyclohexane, or the like, or a reactant of one or more of the above-described polyisocyanates and a polyol.

In one example, by including the crosslinking agent, the adhesive composition of the present application may conduct a crosslinking reaction with a crosslinkable functional group included in the polymer included in the thermocurable resin.

In one embodiment of the present specification, the thermocurable resin has a weight average molecular weight of 1,000,000 g/mol or greater.

In one embodiment of the present specification, the thermocurable resin has a weight average molecular weight of greater than or equal to 1,000,000 g/mol and less than or equal to 2,000,000 g/mol.

In one embodiment of the present specification, the thermocurable resin having a weight average molecular weight of 1,000,000 g/mol or less has a problem of weakening durability, and the weight average molecular weight being 2,000,000 g/mol or greater has a problem of decreasing coatability and increasing stress when folding.

The weight average molecular weight of the present specification is measured using a method of measuring a general polymer by gel permeation chromatography (GPC), and polystyrene of which molecular weight is already known is used as a base in the measurement.

In one embodiment of the present specification, the ionic salt is a metal salt or an organic salt.

In one embodiment of the present specification, the ionic salt means an ionic salt including a cation and an anion.

In one embodiment of the present specification, a metal salt may be used as the ionic salt. Examples of the metal salt may include an alkali metal cation or an alkaline earth metal cation. Examples of the cation may include one, two or more types of a lithium ion ($Li^+$), a sodium ion ($Na^+$), a potassium ion ($K^+$), a rubidium ion ($Rb^+$), a cesium ion ($Cs^+$), a beryllium ion ($Be^{2+}$), a magnesium ion ($Mg^{2+}$), a calcium ion ($Ca^{2+}$), a strontium ion ($Sr^{2+}$), a barium ion ($Ba^{2+}$) and the like. For example, one, two or more types of a lithium ion, a sodium ion, a potassium ion, a magnesium ion, a calcium ion and a barium ion may be used, or a lithium ion may be used considering ion stability and mobility.

Examples of the anion included in the ionic compound may include $PF_6^-$, $AsF$, $NO^{2-}$, a fluoride ($F^-$), a chloride ($Cl^-$), a bromide ($Br-$), an iodide ($I^-$), a perchlorate ($ClO_4^-$), a hydroxide ($OH^-$), a carbonate ($CO_3^{2-}$), a nitrate ($NO_3^-$), a trifluoromethanesulfonate ($CF_3SO_3^-$), a sulfonate ($SO_4^-$), a hexafluorophosphate ($PF_6^-$), a methylbenzenesulfonate ($CH_3(C_6H_4)SO_3^-$), a p-toluenesulfonate ($CH_3C_6H_4SO_3^-$), a tetraborate ($B_4O_7^{2-}$), a carboxybenzenesulfonate (COOH $(C_6H_4)SO_3^-$), a trifluoromethanesulfonate ($CF_3SO_2^-$), a benzoate ($C_6H_5COO^-$), an acetate ($CH_3COO^-$), a trifluoroacetate ($CF_3COO^-$), a tetrafluoroborate ($BF_4^-$), a tetrabenzylborate ($B(C_6H_5)_4^-$), a trispentafluoroethyl trifluorophosphate ($P(C_2F_5)_3F_3^-$) or the like.

In one embodiment of the present specification, the anion is represented by the following Chemical Formula 1.

[X(YO$m$Rf)$n$]<sup>−</sup>       [Chemical Formula 1]

In Chemical Formula 1, X is a nitrogen atom or a carbon atom, Y is a carbon atom or a sulfur atom, Rf is a perfluoroalkyl group, m is 1 or 2, and n is 2 or 3. In Chemical Formula 1, m is 1 when Y is carbon, m is 2 when Y is sulfur, n is 2 when X is nitrogen, and n is 3 when X is carbon.

In another example, the anion represented by Chemical Formula 1, bisfluorosulfonylimide or the like may also be used as the anion.

In the present specification, the anion of Chemical Formula 1 or the bis(fluorosulfonyl)imide exhibits high electronegativity due to a perfluoroalkyl group (Rf) or a fluoro group, and by including a unique resonance structure, exhibits hydrophobicity while forming a weak bond with a cation. Accordingly, the ionic compound has excellent compatibility with other components of the composition such as an adhesive resin. Rf of Chemical Formula 1 may be a perfluoroalkyl group having 1 to 20 carbon atoms, 1 to 12 carbon atoms, 1 to 8 carbon atoms or 1 to 4 carbon atoms, and in this case, the perfluoroalkyl group may have a linear, branched or cyclic structure. The anion of Chemical Formula 1 may be a sulfonyl methide-based, sulfonyl imide-based, carbonyl methide-based or carbonyl imide-based anion, and specifically, may be one type or a mixture two or more types of tristrifluoromethanesulfonylmethide, bistrifluoromethanesulfonyl imide, bisperfluorobutanesulfonyl imide, bispentafluoroethanesulfonyl imide, tristrifluoromethanecarbonyl methide, bisperfluorobutane carbonyl imide, bispentafluoroethanecarbonyl imide or the like. Examples of the ionic salt may include an organic salt including, as a cation, a quaternary ammonium such as N-ethyl-N,N-dimethyl-N-propylammonium, N,N,N-trimethyl-N-propylammonium, N-methyl-N,N,N-tributylammonium, N-ethyl-N,N,N-tributylammonium, N-methyl-N,N,N-trihexylammonium, N-ethyl-N,N,N-trihexylammonium, N-methyl-N,N,N-trioctylammonium or N-ethyl-N,N,N-trioctylammonium, a phosphonium, a pyridinium, an imidazolium, a pyrrolidinium, a piperidinium or the like with the anion component may also be used, and as necessary, the metal salt and the organic salt may be used together.

In one embodiment of the present specification, the ionic salt is selected from the group consisting of tri-n-butylmethylammonium bistrifluoromethanesulfoneimide, bis(trifluoromethane)sulfonium lithium salt and bis(trifluoromethanesulfonyl)imide.

In one embodiment of the present specification, the ionic salt is included in greater than or equal to 0.01 parts by weight and less than or equal to 10 parts by weight with respect to 100 parts by weight of the thermocurable resin.

In one embodiment of the present specification, the adhesive composition for a foldable display has storage modulus of $10^4$ Pa to $10^6$ Pa at $-30°$ C. and $60°$ C. after curing. The storage modulus satisfying the above-mentioned range is effective in reducing a bleed-out phenomenon and reducing an impact transfer rate. When the storage modulus is lower than the above-mentioned range, a bleed-out phenomenon occurs reducing process efficiency, and when the storage modulus is higher than the above-mentioned range, a large impact is transferred to a substrate during a folding process causing damages to a display. Accordingly, it is useful in forming an adhesive layer having bending reliability suitable for a foldable display.

Each layer of a foldable display is subject to physical forces during a folding process. In this case, an adhesive is more likely to be subject to delamination, bubbles, peel-off and the like compared to in general displays due to a bleed-out phenomenon and physical impacts, and when an impact transfer rate is high, cracks may readily occur on a cover window in contact with the adhesive during a folding process. Accordingly, it is very important for the adhesive composition for a foldable display to reduce a bleed-out phenomenon of an adhesive and reduce an impact transfer rate.

<Measurement of Storage Modulus>

A film is formed with the adhesive composition according to one embodiment of the present specification using an applicator, and after drying for 3 minutes at $140°$ C. through a Mathis oven, an adhesive film having a thickness of 25 μm is prepared. The adhesive film is laminated several times and cut into a specimen having a thickness of 1 mm, and storage modulus is measured using a parallel plate fixture having a diameter of 8 mm using an advanced rheometric expansion system G2 (TA Instruments Inc.) at 1 Hz, 5% strain and $10°$ C./min.

In one embodiment of the present specification, the thermocurable resin has a glass transition temperature of $-70°$ C. or lower.

In one embodiment of the present specification, the thermocurable resin has a glass transition temperature of higher than or equal to $-200°$ C. and lower than or equal to $-70°$ C.

The glass transition temperature of the thermocurable resin according to the present specification is measured using a heat flow of the sample using differential scanning calorimetry (DSC).

One embodiment of the present specification provides an adhesive film including a cured material of the adhesive composition for a foldable display.

In one embodiment of the present specification, the composition is preferably thermally cured.

In one embodiment of the present specification, heat treatment may be conducted after thermal drying by the thermal curing.

In one embodiment of the present specification, the thermal drying is preferably conducted by the thermal curing.

In one embodiment of the present specification, the thermal drying is preferably drying for 1 minute to 10 minutes at $100°$ C. to $150°$ C.

In one embodiment of the present specification, the thermal drying is preferably drying for 2 minutes to 4 minutes at $135°$ C. to $145°$ C.

In one embodiment of the present specification, the heat treatment process is preferably leaving the composition unattended for 60 hours to 90 hours at $30°$ C. to $50°$ C.

In one embodiment of the present specification, the adhesive film has a thickness of 10 μm to 50 μm.

In one embodiment of the present specification, the adhesive film has a thickness of 20 μm to 30 μm.

In one embodiment of the present specification, the adhesive film has a thickness of 25 μm.

In one embodiment of the present specification, the adhesive film has a relative dielectric constant of 4 or greater at $25°$ C., 60 RH % and 100 KHz.

<Method of Measuring Relative Dielectric Constant>

As for the relative dielectric constant of the present specification, a capacitance value (Cp) is measured using an impedance gain-phase analyzer, and the following relative dielectric constant value is calculated by the following Equation 1.

$$\varepsilon_r = \frac{C_p h}{A} \times \frac{1}{\varepsilon_0} \qquad \text{[Equation 1]}$$

In Equation 1, $\varepsilon_r$ is a relative dielectric constant of the adhesive film, $C_p$ is a capacitance value (F) of the adhesive film, h is a thickness (m) of the adhesive film, A is an area (m$^2$) of an electrode attached to the adhesive film, and $\varepsilon_0$ is a vacuum dielectric constant of $8.854*10^{-12}$ F/m.

In one embodiment of the present specification, the relative dielectric constant is preferably 4 or greater, it is preferred as the relative dielectric constant value is higher, and the value of up to 20 is possible.

In one embodiment of the present specification, when using the adhesive film having a relative dielectric constant of 4 or greater in an on-cell touch structure, touch resolution is high and a response rate is high, whereas, when the relative dielectric constant is less than 4, touch resolution decreases and sensitivity for the touch also decreases.

Other specific constitutions of a foldable display are known in, for example, Korean Patent Application Laid-Open Publication No 2015-0138450 and the like, and the present application may include such known constitutions of a foldable display without limit except for the adhesive.

In one embodiment of the present specification, the adhesive film is provided between a cover window and a touch panel, or between a touch panel and a display panel.

FIG. 2 illustrates a structure of a foldable display in which a substrate (201); a touch panel or a display panel (202); a polarizing film (203); and a cover window (204) are consecutively laminated, and the adhesive (205) of the present disclosure may be provided between each back plate and a touch panel or a display panel; between a touch panel or a display panel and a polarizing plate; or between a polarizing plate and a cover window.

Hereinafter, examples of the present disclosure will be described in detail so that those skilled in the art may readily implement the present disclosure. However, the present disclosure may be embodied in various different forms, and is not limited to the examples described herein.

Example. 1

1.1 Preparation of Copolymer

To a 1 L reactor having nitrogen gas refluxed and equipped with a cooling device so as to readily control a temperature, a monomer mixture (100 parts by weight) formed with 98 parts by weight of ethylhexyl acrylate (EHA) and 2 parts by weight of acrylic acid (AA) was introduced, and methyl ethyl ketone (MEK) was introduced thereto as a solvent. Next, the reactor was purged with nitrogen gas for approximately 1 hour in order to remove oxygen, and the reactor temperature was maintained at 62° C. After homogenizing the mixture, 400 ppm of azobisisobutyronitrile (AIBN) as a reaction initiator and 400 ppm of n-dodecyl mercaptan (n-DDM) as a chain transfer agent were introduced thereto, and the mixture was reacted. After the reaction, the result was diluted with MEK to prepare a copolymer having a weight average molecular weight of 2,000,000 g/mol.

1.2 Preparation of Adhesive Composition A

To 100 g of the copolymer prepared in the preparation of copolymer, BXX-5240, an epoxy-based crosslinking agent, and BXX-5627, an isocyanate-based crosslinking agent, were introduced after diluted in an ethyl acetate solution to 18% by weight, and the result was uniformly mixed to prepare a composition. After that, with respect to 100 parts by weight of the composition, 3 parts by weight of LiTFSI, an ionic salt additive, was additionally mixed thereto, the result was diluted with a solvent (MEK) to control a solid content so as to obtain viscosity (500 cp to 1500 cp) suitable for coating, and the result was mixed for 15 minutes or longer using a mechanical stirrer to prepare Composition A.

1.3 Preparation of Adhesive Film

Composition A was left unattended at room temperature to remove bubbles generated during the mixing, and formed to a film using an applicator, the result was dried for 3 minutes at 140° C. using a Mathis oven to prepare an adhesive film having a thickness of 25 μm.

Example 2

An adhesive film was prepared in the same manner as in Example 1 except that 5 parts by weight of LiTFSI was used instead of 3 parts by weight the ionic salt additive LiTFSI.

Example 3

An adhesive film was prepared in the same manner as in Example 1 except that 5 parts by weight of NaTFSI was used instead of 3 parts by weight the ionic salt additive LiTFSI.

Example 4

An adhesive film was prepared in the same manner as in Example 1 except that 5 parts by weight of NaFSI was used instead of 3 parts by weight the ionic salt additive LiTFSI.

Example 5

An adhesive film was prepared in the same manner as in Example 1 except that 3 parts by weight of FC-4400 was used instead of 3 parts by weight the ionic salt additive LiTFSI.

Comparative Example 1

An adhesive film was prepared in the same manner as in Example 1 except that an ionic salt additive was not used.

Comparative Example 2

An adhesive film was prepared in the same manner as in Example 2 except that 98 parts by weight of butyl acrylate (BA) was used instead of 98 parts by weight of the ethylhexyl acrylate (EHA).

Comparative Example 3

An adhesive film was prepared in the same manner as in Comparative Example 1 except that 94 parts by weight of butyl acrylate (BA) was used instead of 98 parts by weight of the ethylhexyl acrylate (EHA), and the acrylic acid (AA) was used in 6 parts by weight instead of 2 parts by weight.

Storage modulus, a relative dielectric constant, adhesive strength, static folding and dynamic folding of the adhesive films of Examples 1 to 5 and Comparative Examples 1 to 3 were measured and shown in the following Table 1.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| Storage Modulus (G', Pa) @-30° C. | $5.8 \times 10^5$ | $5.8 \times 10^5$ | $5.7 \times 10^5$ | $5.7 \times 10^5$ | $5.8 \times 10^5$ | $5.8 \times 10^5$ | $1.2 \times 10^6$ | $4.2 \times 10^7$ |
| Storage Modulus (G', Pa) @60° C. | $2.7 \times 10^4$ | $2.4 \times 10^4$ | $3 \times 10^4$ | $2.6 \times 10^4$ | $3 \times 10^4$ | $3 \times 10^4$ | $9.6 \times 10^4$ | $9.7 \times 10^4$ |
| Relative Dielectric Constant (25° C., 60% RH, 100 | 4.41 | 5.24 | 4.13 | 4.56 | 4.04 | 3.64 | 5.07 | 3.12 |

TABLE 1-continued

| | Example 1 | Example 2 | Example 3 | Example 4 | Example 5 | Comparative Example 1 | Comparative Example 2 | Comparative Example 3 |
|---|---|---|---|---|---|---|---|---|
| KHz) | | | | | | | | |
| Adhesive Strength (gf/in) | 928.1 | 903.6 | 949.4 | 941.3 | 879.4 | 973.1 | 834.5 | 1425.5 |
| Static Folding (60° C., 90% RH, 2.5 R, 20 Days) | OK | OK | OK | OK | OK | OK | OK | NG |
| Dynamic Folding (25° C., 2.5 R, 100,000 Times) | OK | OK | OK | OK | OK | OK | NG (Cracks occurred) | NG (Cracks occurred) |

A graph measuring temperature-modulus of the adhesive films of Examples 1 and 2 and Comparative Examples 2 and 3 is shown in FIG. 3.

The storage modulus and the relative dielectric constant were measured in the same manner as in the methods of measuring storage modulus and relative dielectric constant described in the present specification.

<Adhesive Strength Measurement>

The adhesive film was cut to a size of 1 inch×5 inch, laminated on glass and left unattended for 1 day at room temperature, and then adhesive strength was measured at a rate of 300 mm/min using a TA texture analyzer.

<Static Folding Test>

After preparing a specimen to 7.8 cm×14 cm in a 2-set_stack up structure described in FIG. 1, the specimen was folded in half, inserted to a parallel plate having a spacing of 5 mm, and left unattended under a condition of 60° C. and 90% RH. The specimen was collected after 20 days, and the degree of bubble generation and the degree of delamination were visually observed.

It was expressed as OK when there were no bubble generation and no delamination, and expressed as N.G. when there were bubbles or delamination.

The 2-set_stack up structure in FIG. 1 is a laminated structure obtained by consecutively laminating a touch panel or a display panel (101), an adhesive (PSA, 102), a polarizing film (POL, 103), an adhesive (PSA, 104), a hard coating layer (HC, 105), a polyimide layer (PI, 106) and a hard coating layer (HC, 107), and a specimen having the structure was prepared to a size of 7.8 cm×14 cm.

<Dynamic Folding Test>

A specimen was prepared in the same manner as in the static folding and inserted to a parallel plate having a spacing of 5 mm, and a test of folding and unfolding 100,000 times was conducted at 25° C. After the test, the specimen was collected, and the degree of bubble generation the degree of delamination, and cracks on the hard coating layer were visually observed.

It was expressed as OK when there were no bubble generation, no delamination and no cracks on the hard coating layer, and expressed as N.G. when there were bubbles, delamination, or cracks on the hard coating layer.

It was identified that Comparative Examples 1 and 3 that did not use an ion salt additive had a relative dielectric constant of less than 4, and Examples 1 to 5 using an ion salt additive had a relative dielectric constant of 4 or greater.

Accordingly, the adhesive films of Examples 1 to 5 are suitable as an adhesive for a foldable display with higher touch resolution and higher response rate compared to the adhesive films of Comparative Examples 1 and 3.

In addition, Comparative Examples 2 and 3 not satisfying storage modulus according to one embodiment of the present specification had cracks occurring on the hard coating layer in the dynamic folding compared to Examples 1 to 5. Accordingly, it was seen that the adhesive not satisfying storage modulus according to one embodiment of the present specification was not suitable as an adhesive for a foldable display.

The invention claimed is:

1. An adhesive film formed from a curable composition for a foldable display comprising:
   a thermocurable resin;
   an ionic salt; and
   a crosslinking agent,
   wherein the adhesive film has a storage modulus of $10^4$ Pa to $10^6$ Pa at −30° C. and 60° C.,
   wherein the adhesive film has a relative dielectric constant of at least 4 at 25° C., 60 RH % and 100 KHz,
   wherein the adhesive film has an adhesive strength of 879.4-949.4 gf/in,
   wherein the thermocurable resin includes a unit derived from ethylhexyl acrylate and a unit derived from acrylic acid, the unit derived from ethylhexyl acrylate is included in 97 parts by weight to 99 parts by weight; and the unit derived from acrylic acid is included in 1 parts by weight to 3 parts by weight, with respect to 100 parts by weight of the thermocurable resin.

2. The adhesive film composition for a foldable display of claim 1, wherein the ionic salt is an ionic salt including a cation and an anion.

3. The adhesive film of claim 1, wherein the thermocurable resin includes a polymer having a weight average molecular weight of 1,000,000 g/mol or greater and less than or equal to 2,000,000 g/mol.

4. The adhesive film of claim 1, wherein the ionic salt is a metal salt or an organic salt.

5. The adhesive film of claim 2, wherein the ionic salt comprises a metal-cation.

6. The adhesive film of claim 2, wherein the anion is represented by Chemical Formula 1:

 [Chemical Formula 1]

in the Chemical Formula 1,

X is a nitrogen atom or a carbon atom;
Y is a carbon atom or a sulfur atom;
Rf is a perfluoroalkyl group;
m is 1 or 2, and n is 2 or 3; and
m is 1 when Y is carbon, m is 2 when Y is sulfur, n is 2 when X is nitrogen, and n is 3 when X is carbon.

7. The adhesive film of claim 1, wherein the thermocurable resin has a glass transition temperature of −70° C. or lower.

8. The adhesive film of claim 1, wherein the film has a thickness of 10 μm to 50 μm.

9. The adhesive film of claim 1, wherein the film has a relative dielectric constant of 4 to 20 at 25° C., 60 RH % and 100 KHz.

10. A foldable display comprising the adhesive film of claim 1.

11. The foldable display of claim 10, wherein the adhesive film is provided between a cover window and a touch panel, or between a touch panel and a display panel.

12. The adhesive film of claim 4, wherein the metal salt includes an alkali metal cation or an alkaline earth metal cation.

13. A foldable display comprising the adhesive film of claim 8.

14. The foldable display of claim 13, wherein the adhesive film is provided between a cover window and a touch panel, or between a touch panel and a display panel.

\* \* \* \* \*